(12) United States Patent
Bingle

(10) Patent No.: US 9,702,426 B2
(45) Date of Patent: Jul. 11, 2017

(54) THREE SPEED ADJUSTABLE SHOCK ABSORBER HAVING ONE OR MORE MICROVALVES

(71) Applicant: DunAn Microstaq, Inc., Austin, TX (US)

(72) Inventor: Colin B. Bingle, Austin, TX (US)

(73) Assignee: DUNAN MICROSTAQ, INC., Austin, TX (US)

( * ) Notice: Subject to any disclaimer, the term of this patent is extended or adjusted under 35 U.S.C. 154(b) by 0 days.

(21) Appl. No.: 14/832,521

(22) Filed: Aug. 21, 2015

(65) Prior Publication Data

US 2016/0069414 A1    Mar. 10, 2016

Related U.S. Application Data

(60) Provisional application No. 62/047,382, filed on Sep. 8, 2014.

(51) Int. Cl.
*F16F 9/44* (2006.01)
*F16F 9/34* (2006.01)

(52) U.S. Cl.
CPC . *F16F 9/44* (2013.01); *F16F 9/34* (2013.01)

(58) Field of Classification Search
CPC ........ F16F 9/19; F16F 9/34; F16F 9/44; F16F 9/329; F16F 9/465; F16F 9/512; F16F 9/3482; F16F 9/5132; B60G 13/06; B60G 13/08; B60G 15/12; B60G 17/08; B60G 2202/24; B60G 2500/10; B60G 2500/114; F16K 99/0001; F16K 99/0044; F16K 2099/008

USPC .................. 188/322.13, 266, 318; 267/64.13
See application file for complete search history.

(56) References Cited

U.S. PATENT DOCUMENTS

| | | | | |
|---|---|---|---|---|
| 2,518,553 | A * | 8/1950 | Kieber | F16F 9/34 137/493.8 |
| 4,054,277 | A * | 10/1977 | Sirven | B60G 3/01 188/276 |
| 4,936,424 | A * | 6/1990 | Costa | F16F 9/064 188/314 |
| 6,659,241 | B2 * | 12/2003 | Sendrea | F16F 9/44 188/314 |
| 6,860,369 | B2 | 3/2005 | Weiffen et al. | |
| 8,662,468 | B2 | 3/2014 | Hunnicutt | |
| 8,794,407 | B2 | 8/2014 | Vanbrabant et al. | |
| 2003/0098612 | A1 * | 5/2003 | Maluf | B81B 3/0024 303/119.1 |
| 2005/0056507 | A1 | 3/2005 | Molina et al. | |
| 2011/0127455 | A1 * | 6/2011 | Hunnicutt | B81B 3/0051 251/284 |

(Continued)

FOREIGN PATENT DOCUMENTS

EP    1664583 B1    2/2011

*Primary Examiner* — Robert A Siconolfi
*Assistant Examiner* — San Aung
(74) *Attorney, Agent, or Firm* — MacMillan, Sobanski & Todd, LLC

(57) ABSTRACT

An adjustable shock absorber includes a housing defining an enclosed working space. A wall is formed in the working space and separates the working space into first and second fluid chambers. A compression valve is formed in the wall and a microvalve is attached to the compression valve and is operable to control fluid flow through the compression valve.

16 Claims, 10 Drawing Sheets

(56) References Cited

U.S. PATENT DOCUMENTS

2012/0090426 A1\* 4/2012 Lee .......................... B60K 6/36
74/665 A

\* cited by examiner

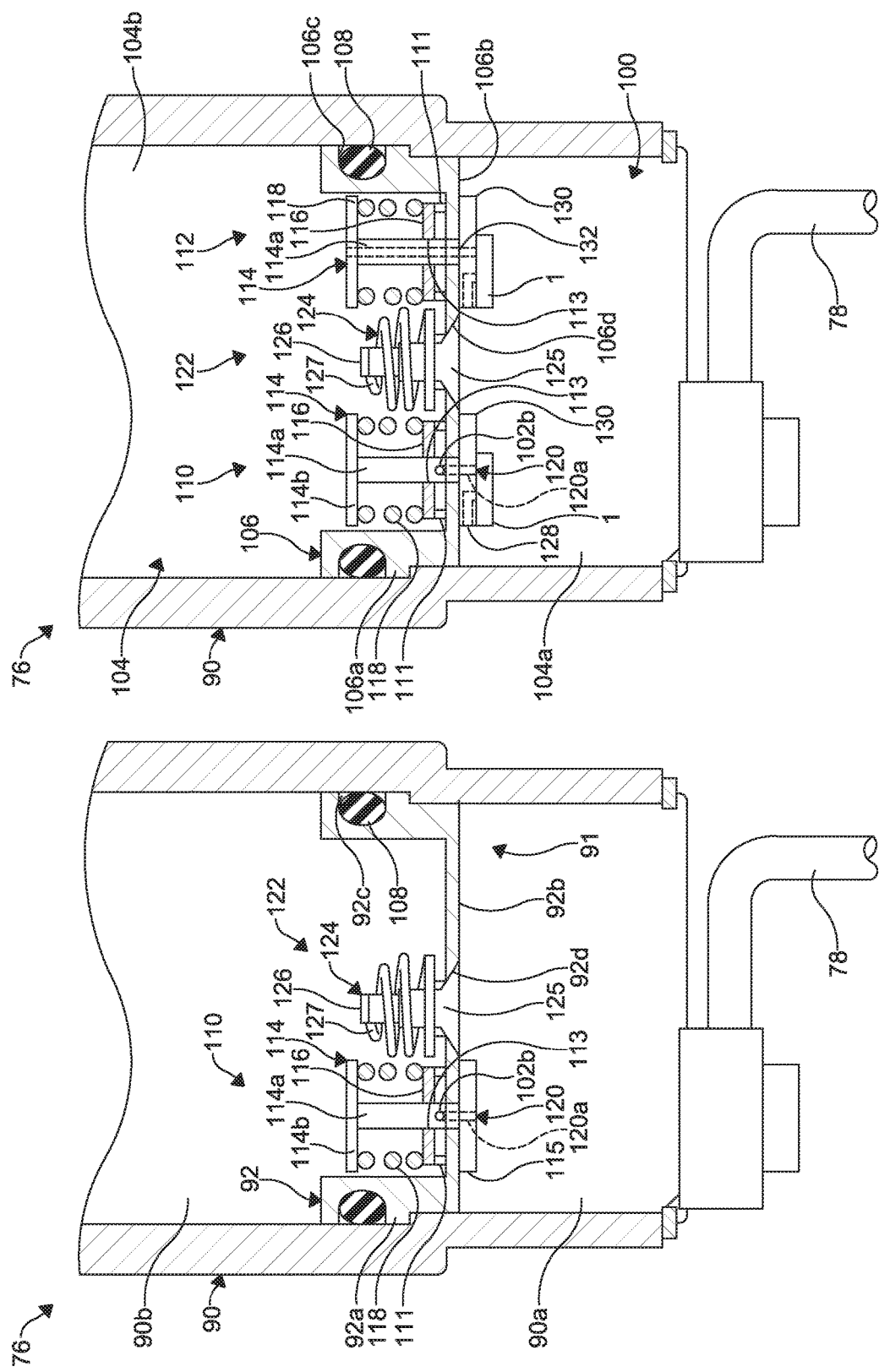

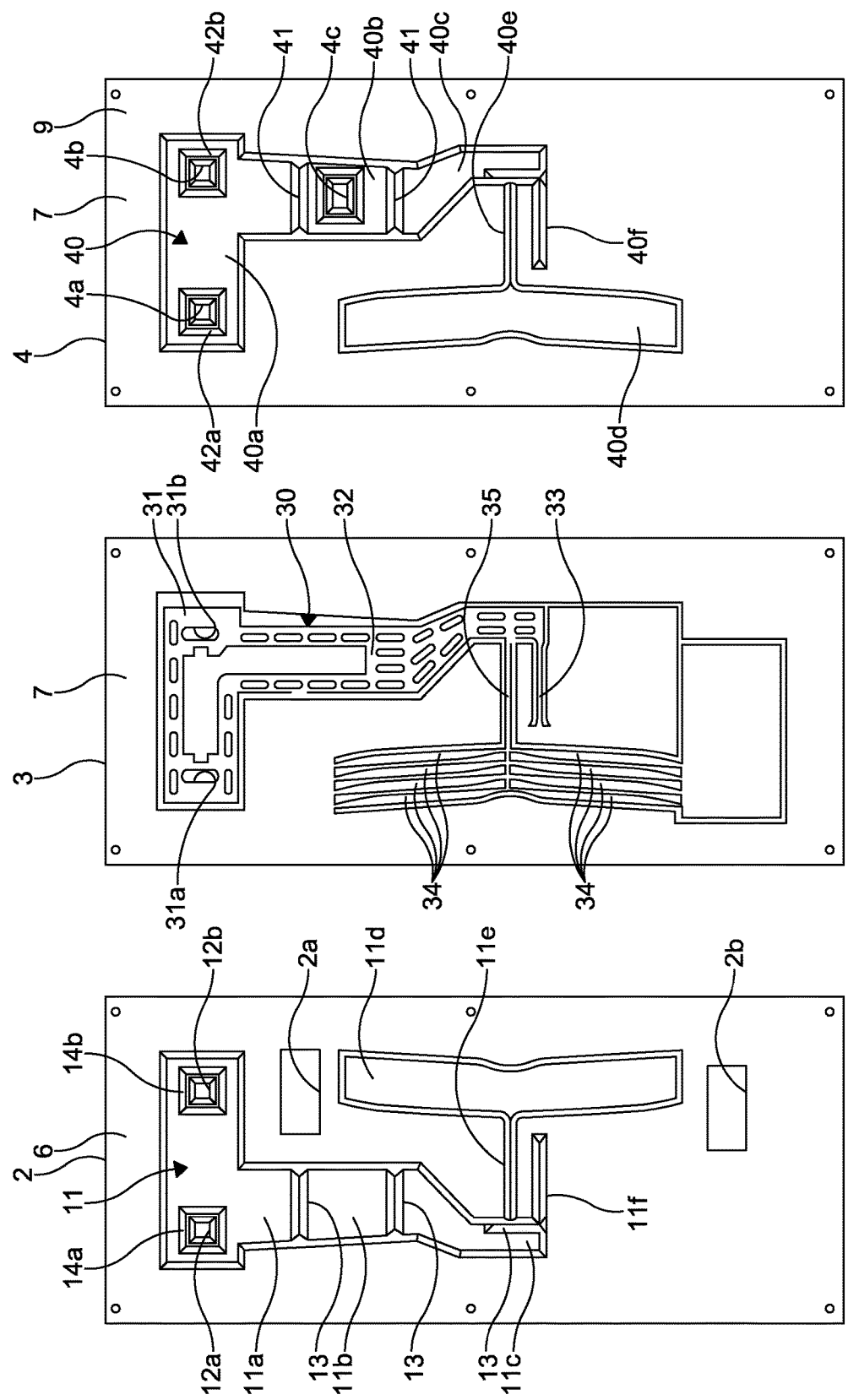

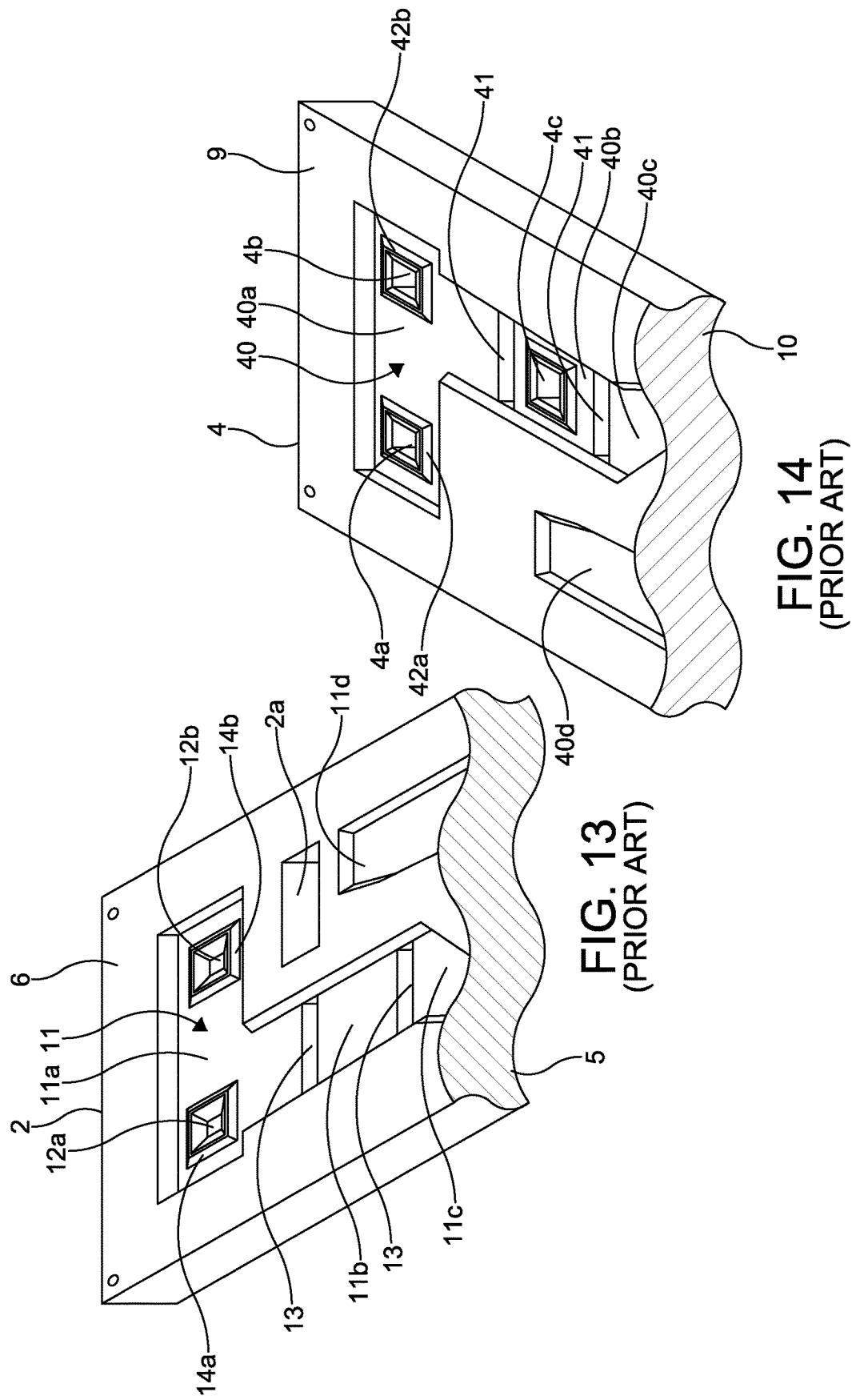

THREE SPEED ADJUSTABLE SHOCK ABSORBER HAVING ONE OR MORE MICROVALVES

CROSS-REFERENCE TO RELATED APPLICATIONS

This application claims the benefit of U.S. Provisional Application No. 62/047,382, filed Sep. 8, 2014, the disclosure of which is incorporated herein by reference.

BACKGROUND OF THE INVENTION

This invention relates to shock absorbers. In particular, this invention relates to an improved structure for an adjustable shock absorber that includes one or more microvalves to control fluid flow in a valve assembly arranged between working chambers in a shock absorber pressure tube and/or in a shock absorber reservoir.

Shock absorbers are used in connection with automotive suspension systems to dampen vibrations, control rate of weight transfer, and improve vehicle comfort and performance. To perform these functions, shock absorbers are generally connected between the body and the suspension of the motor vehicle.

Common shock absorbers for automobiles may be either a mono-tube design or a dual-tube design. In the mono-tube design, a piston is located within a pressure tube and is connected to the sprung mass of the vehicle through a piston rod. The pressure tube is connected to the unsprung mass of the vehicle. The piston divides the pressure tube into an upper working chamber and a lower working chamber. A conventional piston includes compression valves, which limit the flow of damping fluid from the lower working chamber to the upper working chamber during a compression stroke, and rebound valves, which limit the flow of damping fluid from the upper working chamber to the lower working chamber during a rebound or extension stroke. Because the compression valves and the rebound valves have the ability to limit the flow of damping fluid, the shock absorber is able to produce a damping force which counteracts the vibrations and weight transfer which would otherwise be transmitted from the unsprung mass to the sprung mass.

In a dual-tube shock absorber, a fluid reservoir is defined between the pressure tube and a reservoir tube which is positioned around the pressure tube. In both a mono-tube and a dual-tube shock absorber, a base valve assembly may be located between the lower working chamber and a fluid reservoir to control the flow of damping fluid. In such a shock absorber, compression valves are located in the base valve assembly. In addition to the compression valves, the base valve assembly will include a check valve assembly which allows unrestricted fluid flow in one direction into the lower chamber from the reservoir during a rebound stroke. The compression valves of the base valve assembly and the compression valves of the piston assembly together produce the damping force during a compression stroke, and the rebound valves of the piston produces the damping force during a rebound or extension stroke.

The valve assemblies in the shock absorber control fluid flow between the two chambers and the reservoir during the stroking of the shock absorber. By controlling the fluid flow between the two chambers and the reservoir, pressure drops and pressure increases occur, and contribute to the damping forces of the shock absorber. The valve assemblies can be used to tune the damping forces to control ride and handling as well as noise, vibration, and harshness.

Shock absorbers may be adjustable to meet driver preferences. For example, a driver may prefer a softer performance or feel on rough roads and a firmer feel on smooth roads. Generally, the greater degree to which the flow of damping fluid within the lower working chamber is restricted, the greater are the damping forces provided by the shock absorber. Thus, a soft compression and rebound stroke is produced when the flow of damping fluid is relatively unrestricted and a firm compression and rebound stroke is produced when the flow of damping fluid is restricted.

However, a conventional base valve assembly is not adjustable between desired soft, medium, and firm performance settings. Thus, it would be desirable to provide an improved structure for a valve assembly arranged between working chambers in a shock absorber pressure tube and/or in a shock absorber reservoir.

SUMMARY OF THE INVENTION

This invention relates to an improved structure for a shock absorber that includes a base valve assembly with microvalves that allows the valves in the base valve assembly to be adjusted to meet driver preferred shock absorber performance or feel, such as a softer feel and a firmer feel. In one embodiment, the adjustable shock absorber includes a housing defining an enclosed working space. A wall is formed in the working space and separates the working space into first and second fluid chambers. A compression valve is formed in the wall and a microvalve is attached to the compression valve and is operable to control fluid flow through the compression valve.

Various advantages of the invention will become apparent to those skilled in the art from the following detailed description, when read in view of the accompanying drawings.

BRIEF DESCRIPTION OF THE DRAWINGS

FIG. 3 is a cross sectional view of a portion of a remote reservoir showing a conventional base valve assembly within the remote reservoir housing.

FIG. 4 is a cross sectional view of a portion of the remote reservoir illustrated in FIG. 2 showing an improved base valve assembly according to the invention.

FIG. 10 is a plan view of an inner surface of the cover plate illustrated in FIGS. 8 and 9.

FIG. 11 is a plan view of the intermediate plate illustrated in FIGS. 8 and 9.

FIG. 12 is a plan view of an inner surface of the base plate illustrated in FIGS. 8 and 9.

FIG. 13 is a perspective view of a portion of the inner surface of the cover plate illustrated in FIG. 10.

FIG. 14 is a perspective view of a portion of the inner surface of the base plate illustrated in FIG. 12.

DETAILED DESCRIPTION OF THE PREFERRED EMBODIMENT

Figure 1:
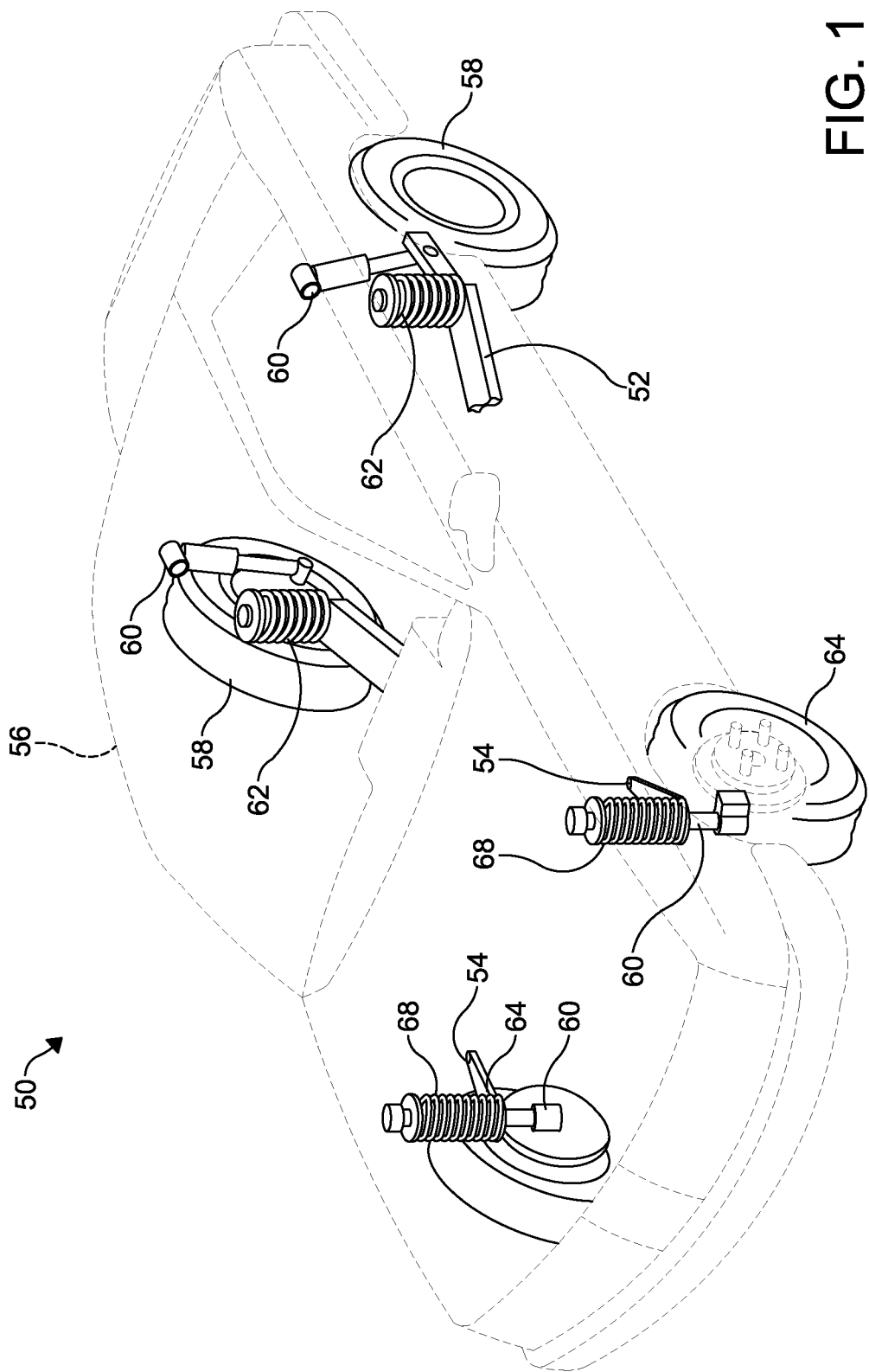
FIG. 1 is perspective view of an automobile that shows the basic structure of a suspension system that includes coil springs and shock absorbers according to this invention at each wheel.

Referring now to the drawings, there is illustrated in FIG. 1 a vehicle 50 which includes a suspension system incorporating an improved adjustable shock absorber in accordance with the present invention. The vehicle 50 includes a rear suspension 52, a front suspension 54, and a body 56. The rear suspension 52 may have a transversely extending rear axle assembly (not shown) adapted to operatively support a pair of rear wheels 58. The rear axle assembly is operatively connected to the body 56 by means of a pair of shock absorbers 60 and a pair of helical coil springs 62. Similarly, the front suspension 54 may include a transversely extending front axle assembly (not shown) to operatively support a pair of front wheels 64. The front axle assembly is operatively connected to the body 56 by means of a second pair of shock absorbers 60 and by a pair of helical coil springs 68.

The shock absorbers 60 serve to dampen the relative motion of the unsprung mass; i.e., the wheels 64 and the front and rear suspension systems 54 and 52, respectively, and the sprung mass; i.e., the body 56.

While the vehicle 50 has been illustrated as a passenger car, the shock absorbers 60 may be used with other types of vehicles or in other applications, such as vehicles incorporating independent front and/or independent rear suspension systems. Further, the term "shock absorber" as used herein refers to dampers in general and thus will include struts, such as MacPherson struts.

The damping characteristics of the adjustable shock absorbers 60 may be controlled in a conventional manner. By controlling the damping characteristics of the adjustable shock absorbers 60, the adjustable shock absorbers 60 are able to dampen the relative movement between the body 56 and the suspension of the motor vehicle 50 in such a manner as to simultaneously optimize both ride comfort and road handling ability.

Figure 2:
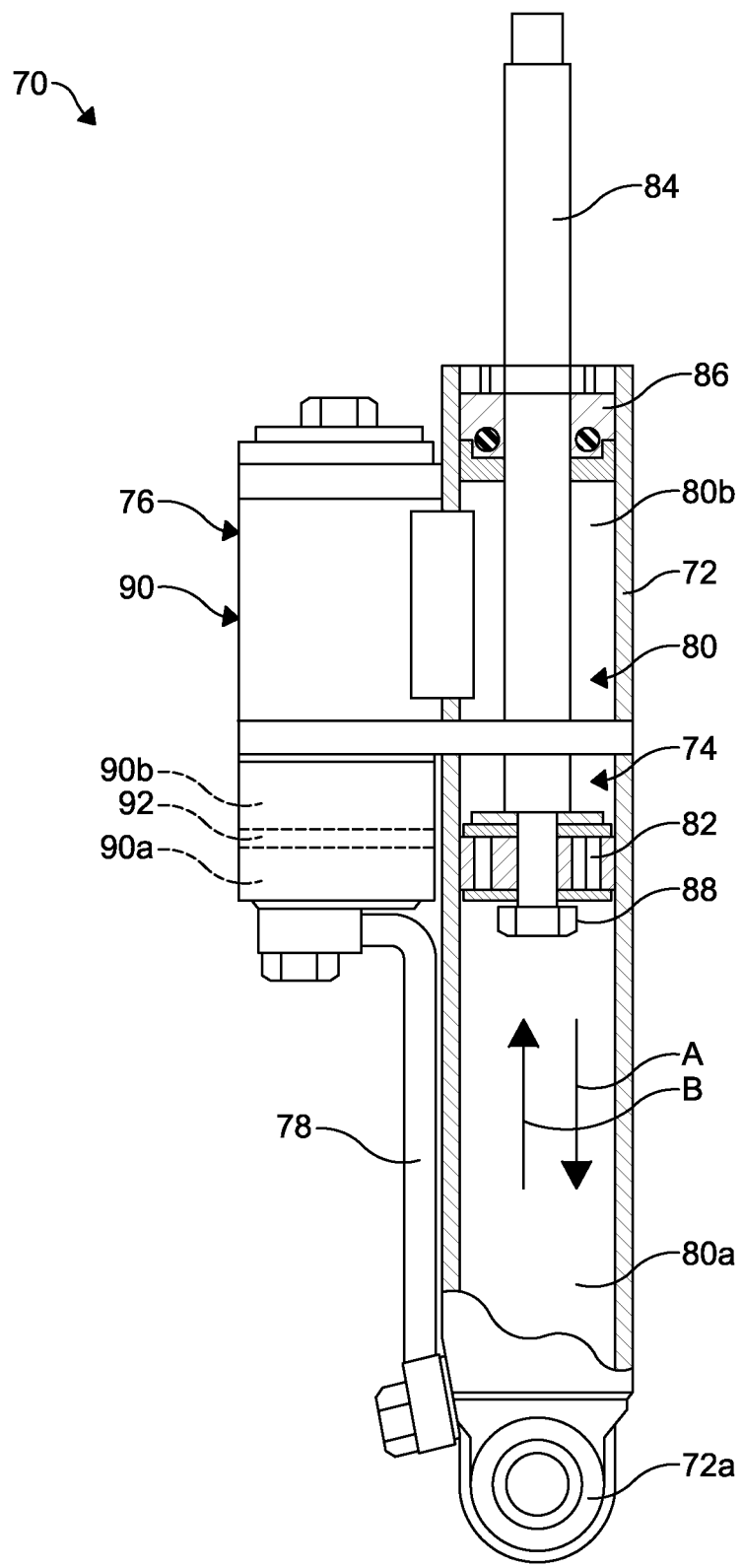
FIG. 2 is a side elevation view, partially in section, of a mono-tube shock absorber according to this invention and including a piston within a pressure tube and a remote reservoir having a base valve assembly therein.

Referring to FIG. 2, there is illustrated an improved structure for a mono-tube shock absorber 70 in accordance with this invention. The illustrated mono-tube shock absorber 70 includes a cylindrical housing or pressure tube 72, a piston assembly 74 disposed in the pressure tube 72, a remote reservoir 76, and a fluid conduit 78 that provides fluid communication between the pressure tube 72 and the remote reservoir 76.

The pressure tube 72 defines a working chamber 80. The piston assembly 74 is slidably disposed in the pressure tube 72 and divides the working chamber 80 into a first or lower working chamber 80a and a second or upper working chamber 80b. The piston assembly 74 includes a piston 82 and a piston rod 84 attached to the piston 82. The piston rod 84 extends through the upper working chamber 80b and through an upper end cap 86 which closes a first end (upper end when viewing FIG. 2) of the pressure tube 72. The distal end of the piston rod 84 is configured to be secured to the sprung mass; i.e., the body 56 of the vehicle 50. An end 72a of the pressure tube 72 opposite the piston rod 84 is configured to be secured to the unsprung mass; i.e., the front and rear suspension systems 54 and 52, respectively. The piston 82 is configured for sliding engagement with an inside surface of the pressure tube 72 without generating undue friction. The piston 82 is also configured to provide a fluid seal between the upper working chamber 80b and the lower working chamber 80a. Valves (not shown in FIG. 2), such as compression and rebound valves in the piston 82 control the movement of fluid between the upper and lower working chambers 80b and 80a, respectively. The piston 82 may be attached to the piston rod 84 by a threaded fastener 88. Alternatively, the piston 82 may be attached to the piston rod 84 by any desired means, such as by welding.

The remote reservoir 76 is conventional in the art and includes a substantially tubular housing 90 attached to the pressure tube 72. In the illustrated embodiment, the housing 90 is attached to a side wall of the pressure tube 72. Alternatively, the housing 90 may be attached to any desired portion of the pressure tube 72.

As best shown in FIG. 3, a conventional base valve assembly 91 is mounted within the remote reservoir 76. The base valve assembly 91 includes a base 92 which separates the housing 90 into a first or lower working chamber 90a and an upper chamber or reservoir 90b.

The base 92 is substantially cup-shaped, having an annular side wall 92a and an end wall 92b. The side wall 92a is configured for sealing engagement with an inside surface of the housing 90. If desired, a resilient seal 108, such as an O-ring, may be disposed between the side wall 92a and the inside surface of the housing 90. In the illustrated embodiment, the seal 108 is disposed in a circumferential groove 92c formed in an outside surface of the side wall 92a. Alternatively, the seal 108 may be disposed in a circumferential groove (not shown) formed in an inside surface of the housing 90.

The conventional base valve assembly 91 includes at least one compression valve 110. In the illustrated embodiment, the compression valve 110 is shown as a compression pin/spring valve. The conventional base valve assembly 91 also includes one replenishing valve 122. Alternatively, the compression valve 110 and the replenishing valve 122 may be any other suitable valve, such as a conventional disc valve.

The compression valve 110 includes a substantially cylindrical valve seat 111. A pin 114 includes a shaft 114a and a disc shaped retainer 114b attached at a first end of the shaft 114a. A mounting plate 115 is positioned below the end wall 92b in the chamber 90a. A second end of the shaft 114a extends through an aperture in the end wall 92b and is secured to the end wall 92b by the mounting plate 115. A disc shaped valve plate 116 includes a centrally formed pin aperture 113. The shaft 114a extends through the aperture 113 and is attached to the valve plate 116. A spring 118 is disposed between the valve plate 116 and the retainer 114b and urges the valve plate 116 into contact with the valve seat 111. A conduit 120 is formed through the mounting plate 115 and the shaft 114a of the pin 114 and provides fluid communication between the chamber 90a and the valve seat 111. The conduit 120 includes an axially extending portion 120a and a transverse portion 120b having at least one opening in the valve seat 111 below the valve plate 116.

The replenishing valve 122 includes a pin 124. The pin 124 has a tapered valve plate 125 and an outwardly extending shaft 126. The tapered valve plate 125 is seated in a valve seat 92d formed in the end wall 92b. The valve seat 92d has a diameter that is smaller than the outside diameter of the valve plate 125. A spring 127 is attached at one end to a distal end of the shaft 126. The other end of the spring 127 engages the end wall 92b and urges the valve plate 125 away from the chamber 90a and into contact with the valve seat 92d. Although not shown in FIG. 3, one or more small fluid flow channels may be formed in the valve seat 92d to allow a small, continuous flow of fluid through the end wall 92b.

The compression valve 110 may be designed with a pre-set opening pressure by selecting a spring constant for the spring 118 and/or selecting the diameter of the conduit 120 to achieve a desired pre-set opening pressure. Similarly, the replenishing valve 122 may be designed with a pre-set opening pressure by selecting a spring constant for the spring 127 to achieve a desired pre-set opening pressure.

The conventional base valve assembly 91 operates in a known manner such that when the piston assembly 74 travels in the direction of the arrow A, as shown in FIG. 2, fluid pressure increases in the lower working chamber 80a, the chamber 90a, and on the end wall 92b. This increase in pressure will continue until the pre-set opening pressure of the compression valve 110 is reached. Once the pre-set opening pressure of the compression valve 110 is reached, fluid pressure operates against the valve plate 116 to compress the spring 118 and unseat the valve plate 116 from the valve seat 111. The fluid pressure in the chamber 90a further holds the replenishing valve 122 in the closed position.

When the piston assembly 74 travels in the reverse direction, i.e., in the direction of the arrow B, as shown in FIG. 2, fluid pressure in the chamber 90a falls below that of the reservoir 90b. When the falling fluid pressure in the chamber 90a reaches a level less that the pre-set opening pressure of the compression valve 110, the compression valve 110 is urged into a closed position. When the pressure in the reservoir 90b exceeds pre-set opening pressure of the replenishing valve 122, fluid pressure in the reservoir 90b operates against the valve plate 125 to compress the spring 127 and unseat the valve plate 125 from the valve seat 92d, allowing fluid flow from the reservoir 90b to the chamber 90a.

Although only one compression valve 110 and one replenishing valve 122 are illustrated, it will be understood that any desired number of compression valves 110 and replenishing valves 122 may be provided. Additionally, if multiple valves 110 and 122 are provided, the additional valves may be designed with pre-set opening pressures different from the valves 110 and 122.

Referring to FIG. 4, a portion of a first embodiment of an improved base valve assembly is shown at 100. The base valve assembly 100 is mounted within the housing 90 of the remote reservoir 76. The housing 90 defines an interior chamber or space 104. The base valve assembly 100 includes a base 106 which separates the interior space 104 into a first or lower working chamber 104a and an upper chamber or reservoir chamber 104b.

The base 106 is substantially cup shaped and has an annular side wall 106a and an end wall 106b. The side wall 106a is configured for sealing engagement with an inside surface of the housing 90. If desired, a resilient seal 108, such as an O-ring, may be disposed between the side wall 106a and the inside surface of the housing 90. In the illustrated embodiment, the seal 108 is disposed in a circumferential groove 106c formed in an outside surface of the side wall 106a. Alternatively, the seal 108 may be disposed in a circumferential groove (not shown) formed in an inside surface of the housing 90.

Figure 5A:
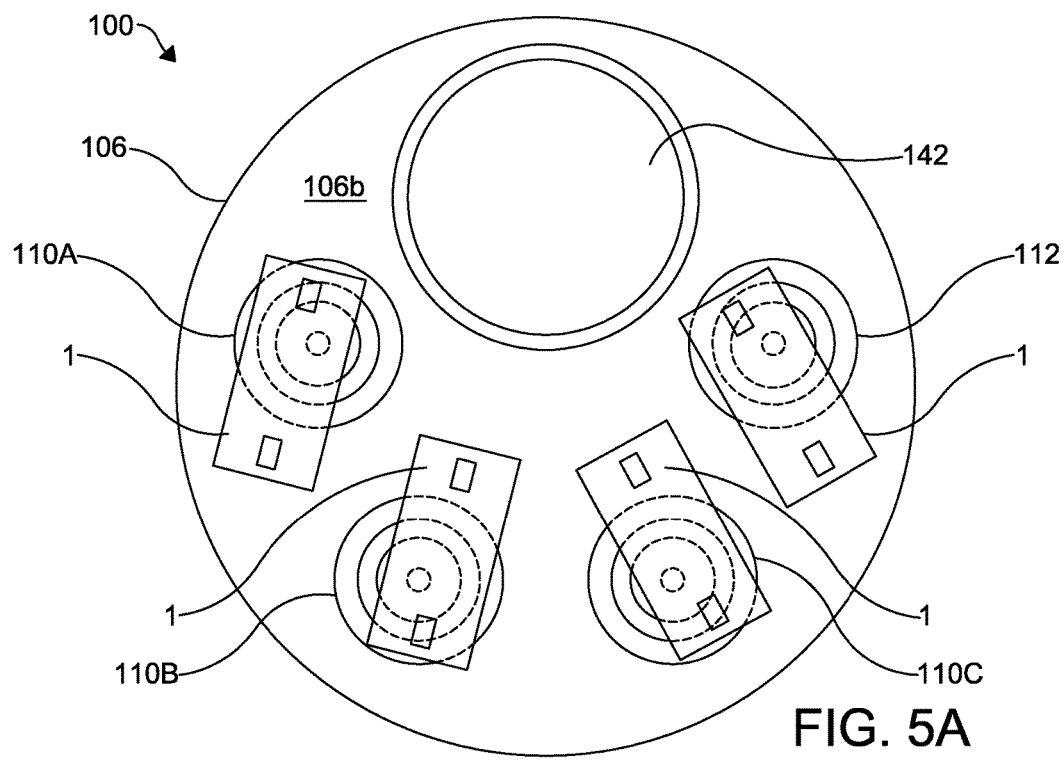
FIG. 5A is a bottom plan view of the improved base valve assembly body illustrated in FIG. 4.
Figure 5B:
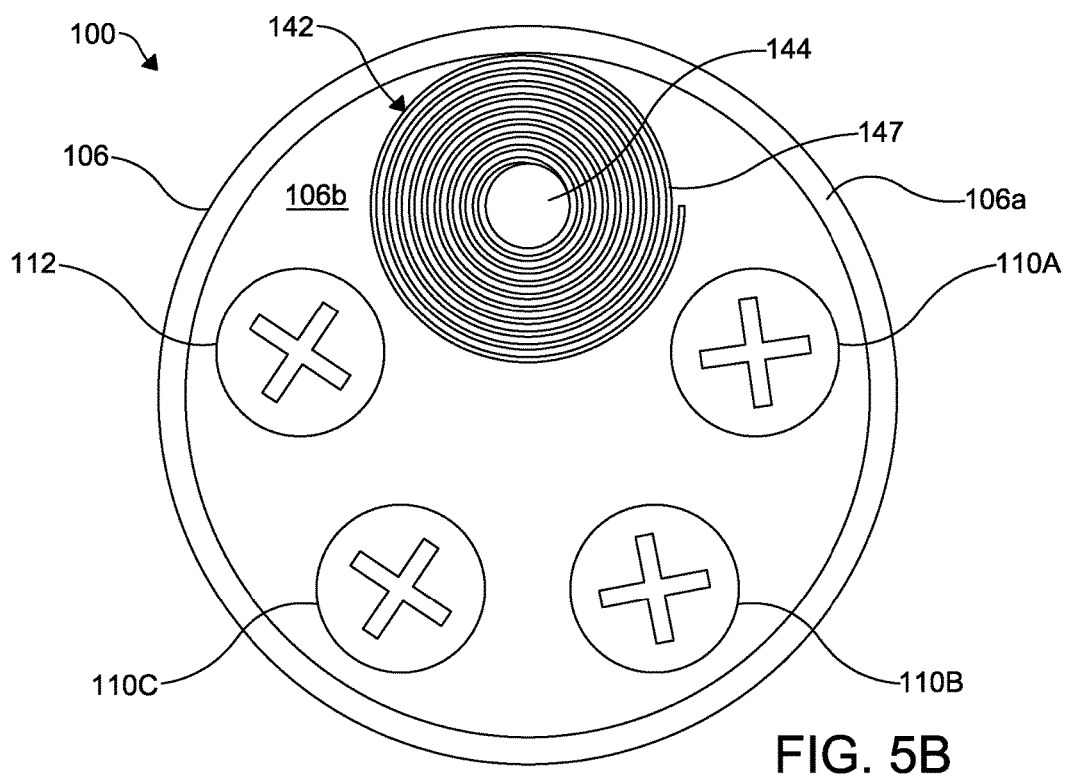
FIG. 5B is a top plan view of the improved base valve assembly body illustrated in FIG. 4.

Referring now to FIGS. 4, 5A, and 5B the base 106 includes the replenishing valve 122 and four valves configured to control the flow of fluid between the lower working chamber 104a of the remote reservoir 76 and the reservoir chamber 104b of the remote reservoir 76, and thus change the force/velocity characteristics of the shock absorber's performance curve. A shock absorber performance curve typically includes three portions: a low speed portion, a mid speed portion, and a high speed portion. The low speed portion is typically controlled by an orifice, and the mid and high speed portions are typically controlled by compression valves in a valve assembly, such as the base valve assembly 91.

As shown in FIGS. 5A and 5B, three compression valves 110A, 110B, and 110C are pre-set to operate in response to high speed and mid speed operation of the shock absorber. These pre-set configurations of the compression valves 110A, 110B, and 110C correspond to a soft, a medium, and a firm compression force displacement performance curves, and further correspond to soft, medium, and firm feel of the shock absorber, as experienced by a vehicle occupant. Additionally, a second compression valve 112 is configured to adjust the low speed characteristic of the performance curve. A second embodiment of the replenishing valve 142 is shown in FIGS. 5A and 5B, and includes the pin 144 and a conical spring 147.

For example, for a soft ride or feel, the compression valve 110A may be configured with a relatively large diameter conduit 120 and with a spring 118 having a relatively low spring rate; i.e. a soft spring. Conversely, for a firm ride or feel, the compression valve 110B may be configured with a relatively small diameter conduit 120 and with a spring 118 having a relatively high spring rate; i.e. a firm or stiff spring. For a ride or feel that is intermediate the soft and firm feel, the compression valve 110C may be configured with a conduit 120 having a diameter intermediate the diameters of the conduits 120 in the compression valves 110A and 110B configured for a soft and a firm feel, respectively. Similarly, the compression valve 110C may be configured with a spring 118 having a spring rate intermediate the spring rates of the springs 118 in the valves 110A and 110B configured for soft and firm feel, respectively.

As described above, the replenishing valve 122 includes the pin 124 having the tapered valve plate 125 and the outwardly extending shaft 126. In the embodiment illustrated in FIG. 4, the tapered valve plate 125 is seated in a valve seat 106d formed in the end wall 106b. The replenishing valve 142 is substantially similar to the replenishing valve 122, but includes the conical spring 147 and the pin 144.

The compression valves 110A, 110B, and 110C are also formed as described above, and each valve 110A, 110B, and 110C additionally has a microvalve 1 attached thereto, the purpose for which will be described below. The conduit 120 formed through a mounting plate 130 and the shaft 114a of the pin 114 provides fluid communication between the microvalve 1 and the valve seat 111. Further, the mounting plate 130 includes a second conduit 128 formed therethrough. The conduit 128 provides fluid communication between the working chamber 104a and the microvalve 1.

The second compression valve 112 is similar to the compression valves 110A, 110B, and 110C and includes the pin 114, the valve plate 116 urged into contact with the valve seat 111 by the spring 118, the mounting plate 130, and the microvalve 1. A conduit 132 is formed through the mounting plate 130 and the entire axial length of the shaft 114a of the pin 114 and provides fluid communication between the microvalve 1 and the reservoir chamber 104b.

Figure 6:
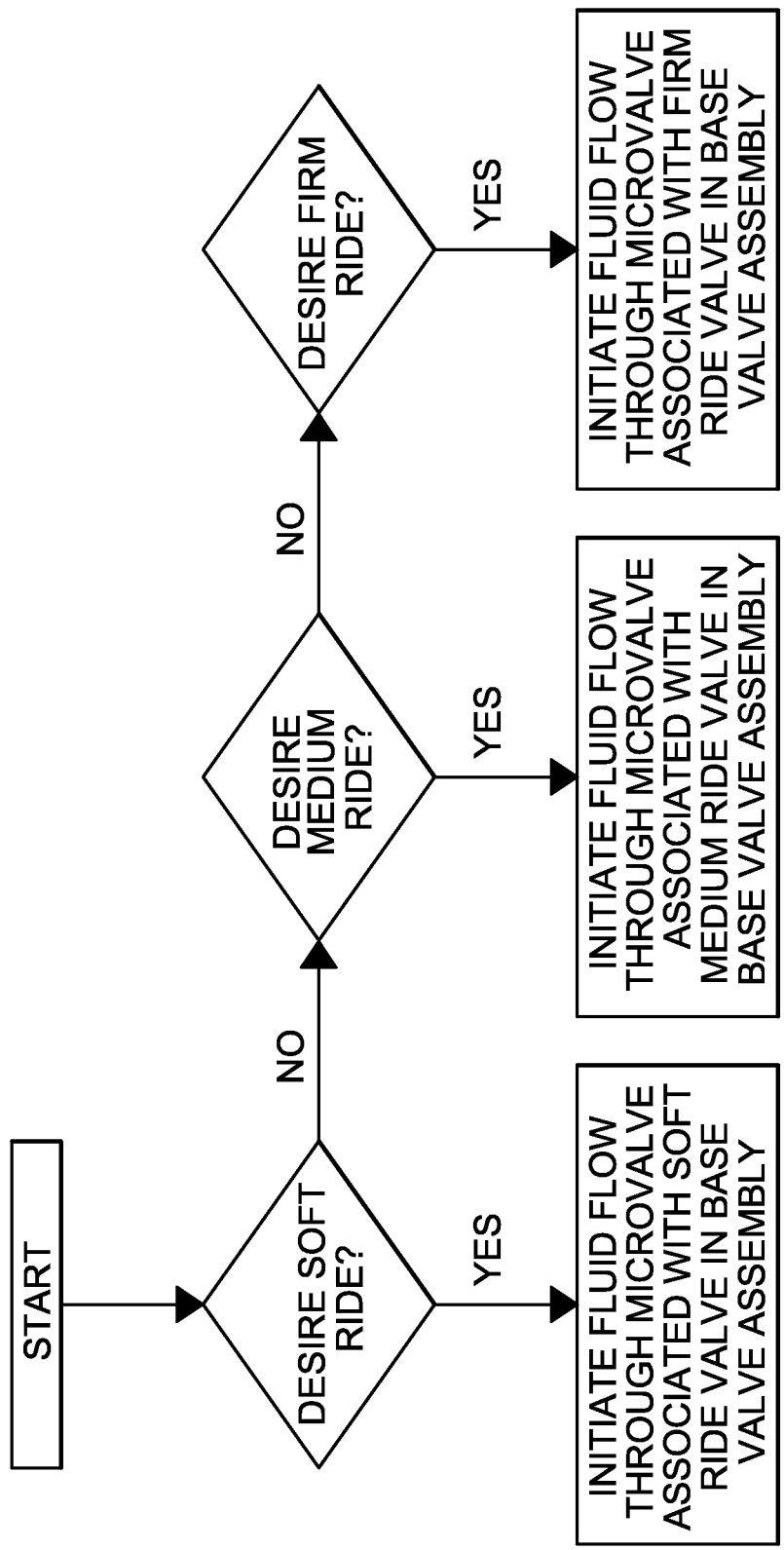
FIG. 6 is a flow chart showing the process of selecting a desired ride or feel of the adjustable shock absorber according to the invention.

In the illustrated embodiment, the microvalves 1 may be configured as normally closed or normally open valves that can be selectively actuated, such as by a vehicle driver, as diagrammatically illustrated in FIG. 6. For example, when the driver desires a soft ride, the driver may engage an actuator (not shown) in the vehicle to initiate fluid flow through the microvalve 1 attached to the compression valve 110A configured for a soft ride or feel, allowing a relatively large flow of fluid through the compression valve 110A and into the reservoir chamber 104b. Similarly, when the driver desires a firm ride, the driver may engage the actuator (not shown) in the vehicle to initiate fluid flow through the microvalve 1 attached to the compression valve 110B configured for a firm ride or feel, allowing a relatively small flow of fluid through the compression valve 110B and into the reservoir chamber 104b. Further, when the driver desires a medium ride, or a ride that is intermediate the soft and the firm rides, the driver may engage the actuator (not shown) in the vehicle to initiate fluid flow through the microvalve 1 attached to the compression valve 110C configured for a ride or feel intermediate the soft ride or feel and the firm ride or feel, allowing a flow of fluid through the compression valve 110C and into the reservoir chamber 104b that is intermediate the relatively large flow of fluid through the compression valve 110A and the relatively small flow of fluid through the compression valve 110B.

Alternatively, if desired, two or three of the compression valves 110A, 110B, and 110C may be operated simultaneously by simultaneous actuation of their attached microvalves 1. Such simultaneous operation of the valves 110A, 110B, and 110C provides the vehicle operator with additional ride or feel options, especially in the intermediate range between the soft and firm feel settings. Additionally, fluid flow through the valves 110A, 110B, and 110C may be fine tuned using the pulse width modulation (PWM) capability of the microvalves 1.

The second compression valve 112 is configured to allow only the minimal fluid flow necessary during low speed operation of the shock absorber 70. In the illustrated embodiment, the microvalve 1 attached to the second compression valve 112 may be configured to provide within the range of about 10 to about 100 percent of the maximum fluid flow capability of the second compression valve 112. Alternatively, the second compression valve 112 may be replaced by one or more orifices (not shown) through which the microvalve may control the flow of fluid to the reservoir chamber 104b.

Although illustrated as a mono-tube shock absorber with a remote reservoir, the shock absorber 70 may be any shock absorber with a base valve assembly, such as a dual-tube shock absorber. Alternatively, the shock absorber 70 may be a mono-tube shock absorber without a remote reservoir or a dual-tube shock absorber without a remote reservoir, wherein the improved base valve assembly 100 is mounted within the pressure tube of the mono-tube or the dual-tube shock absorber.

Figure 7:
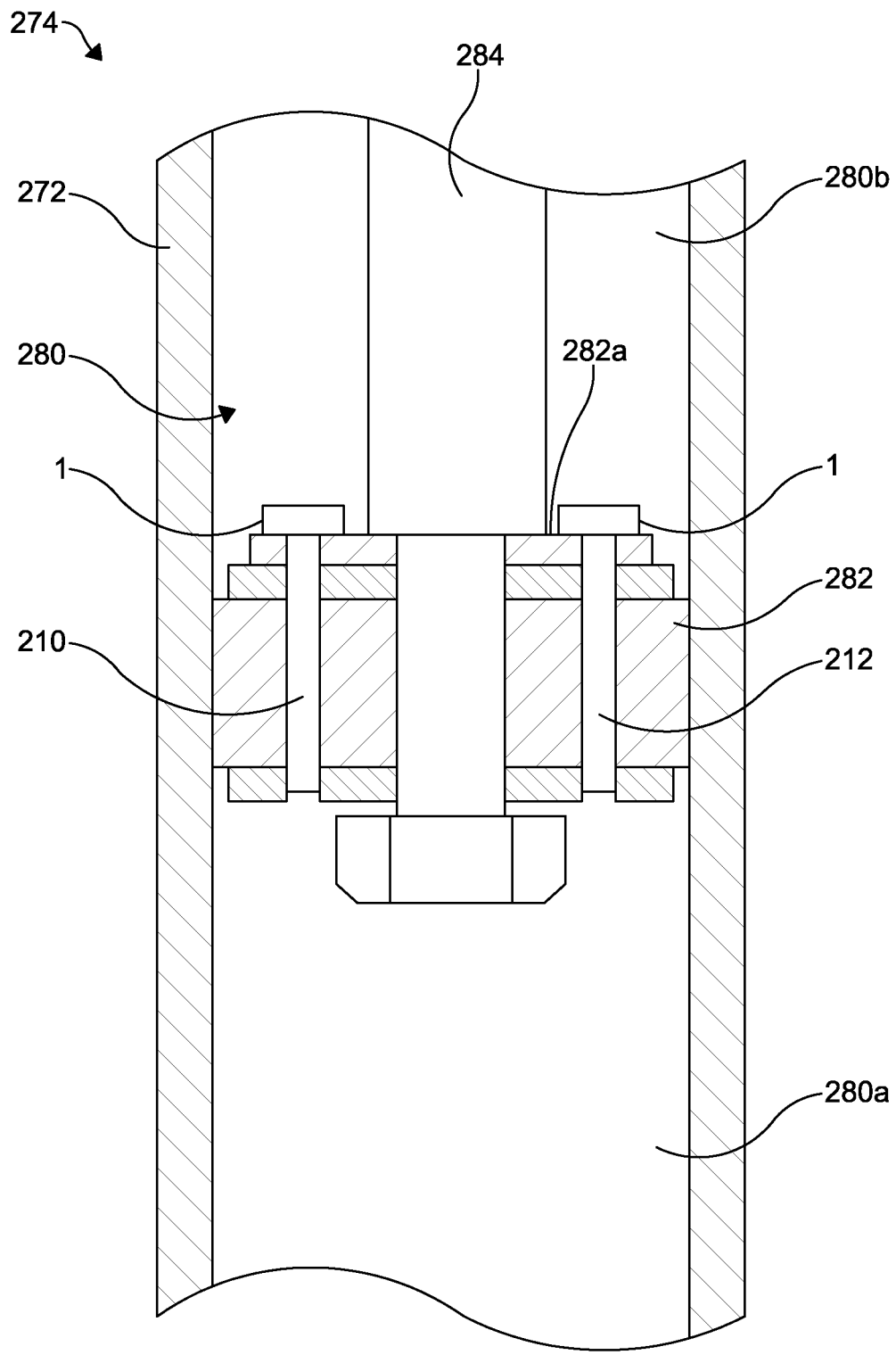
FIG. 7 is an enlarged cross-sectional view of a portion of the piston assembly illustrated in FIG. 2 showing an improved piston according to the invention.

Referring to FIG. 7, a portion of a second embodiment of the piston assembly is shown at 274. The piston assembly 274 is similar to the piston assembly 74 and is disposed in the cylindrical pressure tube 272. The pressure tube 272 defines a working chamber 280. The piston assembly 274 is slidably disposed in the pressure tube 272 and divides the working chamber 280 into a first or lower working chamber 280a and a second or upper working chamber 280b. The piston assembly 274 includes a piston 282 and a piston rod 284 attached to the piston 282.

Like the base 106 of the remote reservoir 76, the piston 282 of the piston assembly 274 may include one or more compression valves, one of which is shown schematically at 210. The compression valves 210 are similar to the compression valves 110A, 110B, and 110C and may be pre-set to correspond to a desired soft, medium, and/or firm feel of the shock absorber, as experienced by a vehicle occupant. Additionally, the piston 282 may include a second compression valve, shown schematically at 212, configured to adjust the low speed characteristic of the performance curve. The second compression valve 212 is also similar to the second compression valve 112.

Each of the compression valves 210 and the second compression valve 212 has one of the microvalves 1 attached thereto. As described above, the microvalves 1 may be configured as normally closed or normally open valves that can be selectively actuated, such as by a vehicle driver, as diagrammatically illustrated in FIG. 6 to control the flow of fluid through the microvalve 1, and therefore through the compression 210 and 212, to achieve a desired ride characteristic, such as a soft ride, a medium ride, or a firm ride.

The second embodiment of the piston assembly 274 may be used with the improved base valve assembly 100. Alternatively, the second embodiment of the piston assembly 274 may be used with the conventional base valve assembly 91.

Generally speaking, a micro-electro-mechanical system is a system that not only includes both electrical and mechanical components, but is additionally physically small, typically including features having sizes that are generally in the range of about ten micrometers or smaller. The term "micromachining" is commonly understood to relate to the production of three-dimensional structures and moving parts of such micro-electro-mechanical system devices. In the past, micro-electro-mechanical systems used modified integrated circuit (e.g., computer chip) fabrication techniques (such as chemical etching) and materials (such as silicon semiconductor material), which were micro-machined to provide these very small electrical and mechanical components. More recently, however, other micro-machining techniques and materials have become available.

As used herein, the term "microvalve" means a valve including features having sizes that are generally in the range of about ten micrometers or smaller and, thus, is also at least partially formed by micro-machining. Lastly, as used herein, the term "microvalve device" means a micro-machined device that includes a microvalve, but further includes additional components. It should be noted that if components other than a microvalve are included in the microvalve device, these other components may be either micro-machined components or standard-sized (i.e., larger) components. Similarly, a micro-machined device may include both micro-machined components and standard-sized components.

A variety of microvalve structures are known in the art for controlling the flow of fluid through a fluid circuit. One well known microvalve structure includes a displaceable member that is supported within a closed internal cavity provided in a valve body for pivoting or other movement between a closed position and an opened position. When disposed in the closed position, the displaceable member substantially blocks a first fluid port that is otherwise in fluid communication with a second fluid port, thereby preventing fluid from flowing between the first and second fluid ports. When disposed in the opened condition, the displaceable member does not substantially block the first fluid port from fluid communication with the second fluid port, thereby permitting fluid to flow between the first and second fluid ports.

Referring again to the drawings, there is illustrated in FIGS. 8 through 15 a basic structure of the conventional microvalve 1. The illustrated microvalve 1 includes a cover plate 2, an intermediate plate 3, and a base plate 4. The cover plate 2 has an outer surface 5 and an inner surface 6. The cover plate 2 also has one or more openings (two of such openings 2a and 2b are shown in the illustrated embodiment) formed therethrough that, in a manner that is well known in the art, allow one or more electrically conductive wires (not shown) to pass therethrough. The intermediate plate 3 has a first surface 7 and a second surface 8. The base plate 4 has an inner surface 9 and an outer surface 10. The base plate 4 also has a one or more openings (three of such openings 4a, 4b, and 4c are shown in the illustrated embodiment) formed therethrough that, in a manner that is well known in the art, allow fluid to flow into and out of the microvalve 1.

Figure 9:
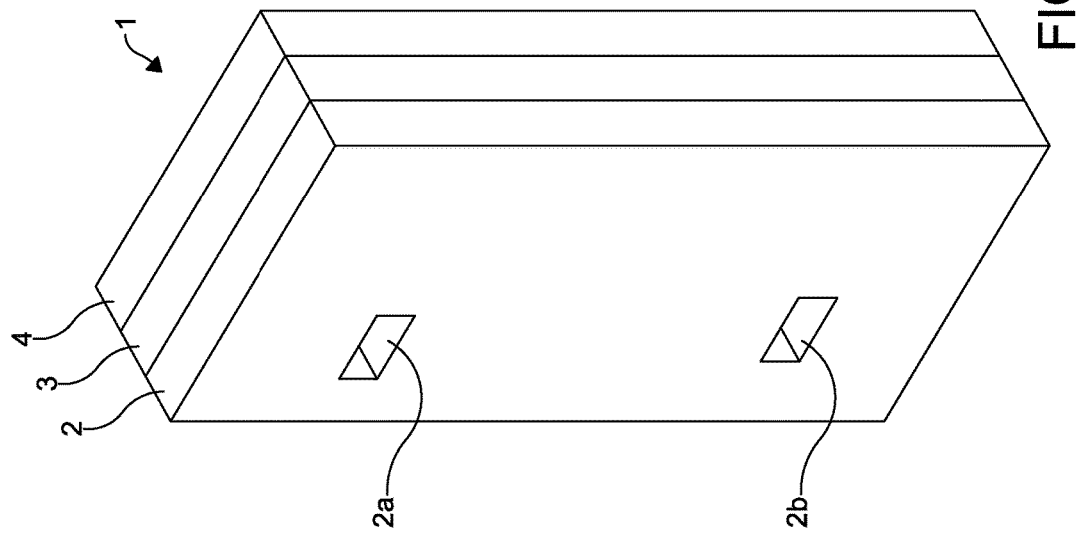
FIG. 9 is a perspective view of the basic structure of the microvalve illustrated in FIG. 8 shown assembled.
Figure 8:
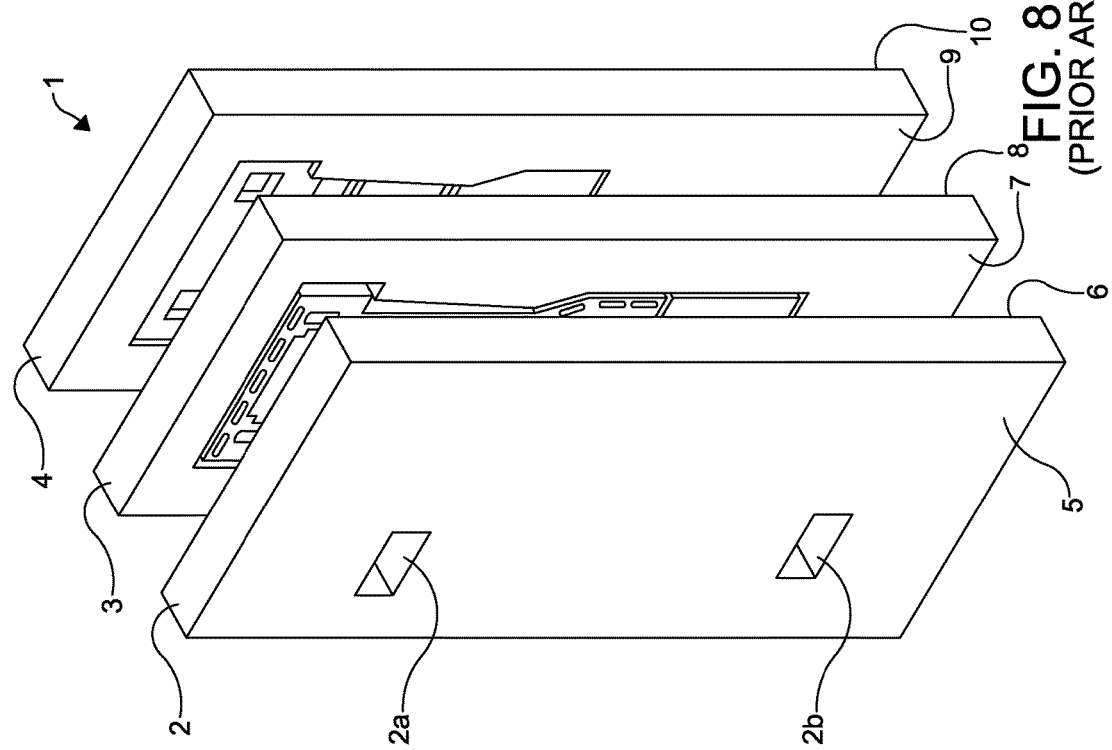
FIG. 8 is an exploded perspective view of a basic structure of a microvalve including a cover plate, an intermediate plate, and a base plate.

When the microvalve 1 is assembled as shown in FIG. 9, the inner surface 6 of the cover plate 2 engages the first surface 7 of the intermediate plate 3, and the inner surface 9 of the base plate 4 engages the second surface 8 of the intermediate plate 3. The cover plate 2, the intermediate plate 3, and the base plate 4 may be retained in this orientation in any desired manner. For example, portions of the cover plate 2 and/or the base plate 4 may be bonded to the intermediate plate 3, such as by fusion bonding, chemical bonding, or physically bonding (such as, for example, mechanical fasteners and/or adhesives). The cover plate 2, the intermediate plate 3, and the base plate 4 may be composed of any desired material or combination of materials. For example, the cover plate 2, the intermediate plate 3, and the base plate 4 may be composed of silicon and/or similar materials.

The structure of the inner surface 6 of the cover plate 2 for the microvalve 1 is illustrated in detail in FIGS. 10 and 13. As shown therein, the cover plate 2 includes an actuator cavity, indicated generally at 11, that is provided on the inner surface 6 thereof. The illustrated actuator cavity 11 includes an upper actuator arm cavity portion 11a, a central actuator arm cavity portion 11b, a lower actuator arm cavity portion 11c, an actuator rib cavity portion 11d, an actuator spine cavity portion 11e, and an actuator hinge cavity portion 11f. The upper actuator arm cavity portion 11a has a pair of recessed areas 12a and 12b provided therein. The illustrated actuator cavity 11 also has one or more pressure equalization depressions 13 provided therein.

The cover plate 2 has a first sealing structure 14a that extends from the bottom surface of the actuator cavity 11 and completely about the perimeter of the first recessed area 12a. Similarly, the cover plate 2 also has a second sealing structure 14b that extends from the bottom surface of the actuator cavity 11 and completely about the perimeter of the second recessed area 12b. In the illustrated embodiment, each of the sealing structures 14a and 14b is a wall that is generally trapezoidal in cross-sectional shape and includes four linearly-extending wall segments that extend adjacent to the four sides of the recessed areas 12a and 12b. However, the sealing structures 14a and 14b may be formed having any desired cross-sectional shape or combination of shapes, and may further extend in any desired manner (linearly or otherwise) about the recessed areas 12a and 12b. For example, the sealing structures 14a and 14b may be formed substantially as shown in FIGS. 10 and 13, but may have rounded corners between adjacent linearly-extending wall segments, have one or more non-linearly-extending wall segments, or be entirely non-linear in shape. The purpose for the sealing structures 14a and 14b will be explained below.

The structure of the first surface 7 of the intermediate plate 3 for the microvalve 1 is illustrated in detail in FIG. 11. As shown therein, the conventional intermediate plate 3 includes a movable valve member or displaceable member, indicated generally at 30, that includes a sealing portion 31 having a pair of openings 31a and 31b formed therethrough. The sealing portion 31 is connected through an elongated arm portion 32 to a hinge portion 33 that is formed integrally with the conventional intermediate plate 3. The intermediate plate 3 also includes an actuator including a plurality of actuator ribs 34 that is connected through a central spine 35 to the elongated arm portion 32 at a location that is intermediate of the sealing portion 31 and the hinge portion 33.

As shown in FIG. 11, first ends of a first portion of the plurality of actuator ribs 34 (the upper ribs 34 when viewing FIG. 11) are flexibly joined at first ends thereof to a first non-moving part of the intermediate plate 3. Second ends of the first portion of the plurality of actuator ribs 34 are connected to the central spine 35. The first non-moving part of the intermediate plate 3 is electrically connected to a first bond pad (not shown) that is provided on the intermediate plate 3. Similarly, first ends of a second portion of the plurality of actuator ribs 34 (the lower ribs 34 when viewing FIG. 11) are flexibly joined at first ends thereof to a second non-moving part of the intermediate plate 3. Second ends of the second portion of the plurality of actuator ribs 34 are also connected to the central spine 35. The second non-moving part of the intermediate plate 3 is electrically connected to a second bond pad (not shown) that is provided on the intermediate plate 3. The second bond pad is electrically isolated from the first bond pad, other than through the plurality of actuator ribs 34.

In a manner that is well known in the art, electrical current may be passed from the first bond pad through the plurality of actuator ribs 34 to the second bond pad. Such electrical current causes thermal expansion of the plurality of actuator ribs 34, which causes axial movement of the central spine 35. As described above, the central spine 35 is connected to the elongated arm portion 32. Consequently, axial movement of the central spine 35 causes the elongated arm portion 32 (and, therefore, the sealing portion 31) of the displaceable member 30 to pivot about the hinge portion 33 or otherwise move relative to the rest of the intermediate plate 3 (such movement occurring within a plane defined by the rest of the intermediate plate 3). Thus, the illustrated displaceable member 30 functions as a conventional microelectro-mechanical system thermal actuator.

The structure of the inner surface 9 of the base plate 4 is illustrated in detail in FIGS. 12 and 14. As shown therein, the base plate 4 includes an actuator cavity, indicated generally at 40, that is provided on the inner surface 9 thereof. The illustrated actuator cavity 40 includes an upper actuator arm cavity portion 40a, a central actuator arm cavity portion 40b, a lower actuator arm cavity portion 40c, an actuator rib cavity portion 40d, an actuator spine cavity portion 40e, and a hinge cavity portion 40f. The illustrated actuator cavity 40 also has one or more pressure equalization depressions 41 provided therein.

The base plate 4 has a first sealing structure 42a that extends from the bottom surface of the actuator cavity 40 and completely about the perimeter of the first opening 4a. Similarly, the base plate 4 also has a second sealing structure 42b that extends from the bottom surface of the actuator cavity 40 and completely about the perimeter of the second opening 4b. In the illustrated embodiment, each of the sealing structures 42a and 42b is a wall that is generally trapezoidal in cross-sectional shape and includes four linearly-extending wall segments that extend adjacent to the openings 4a and 4b. However, the sealing structures 42a and 42b may be formed having any desired cross-sectional shape or combination of shapes, and may further extend in any desired manner (linearly or otherwise) about the openings 4a and 4b. For example, the sealing structures 42a and 42b may have rounded corners between adjacent linearly-extending wall segments, have one or more non-linearly-extending wall segments, or be entirely non-linear in shape. The purpose for the sealing structures 42a and 42b will be explained below.

Figure 15:
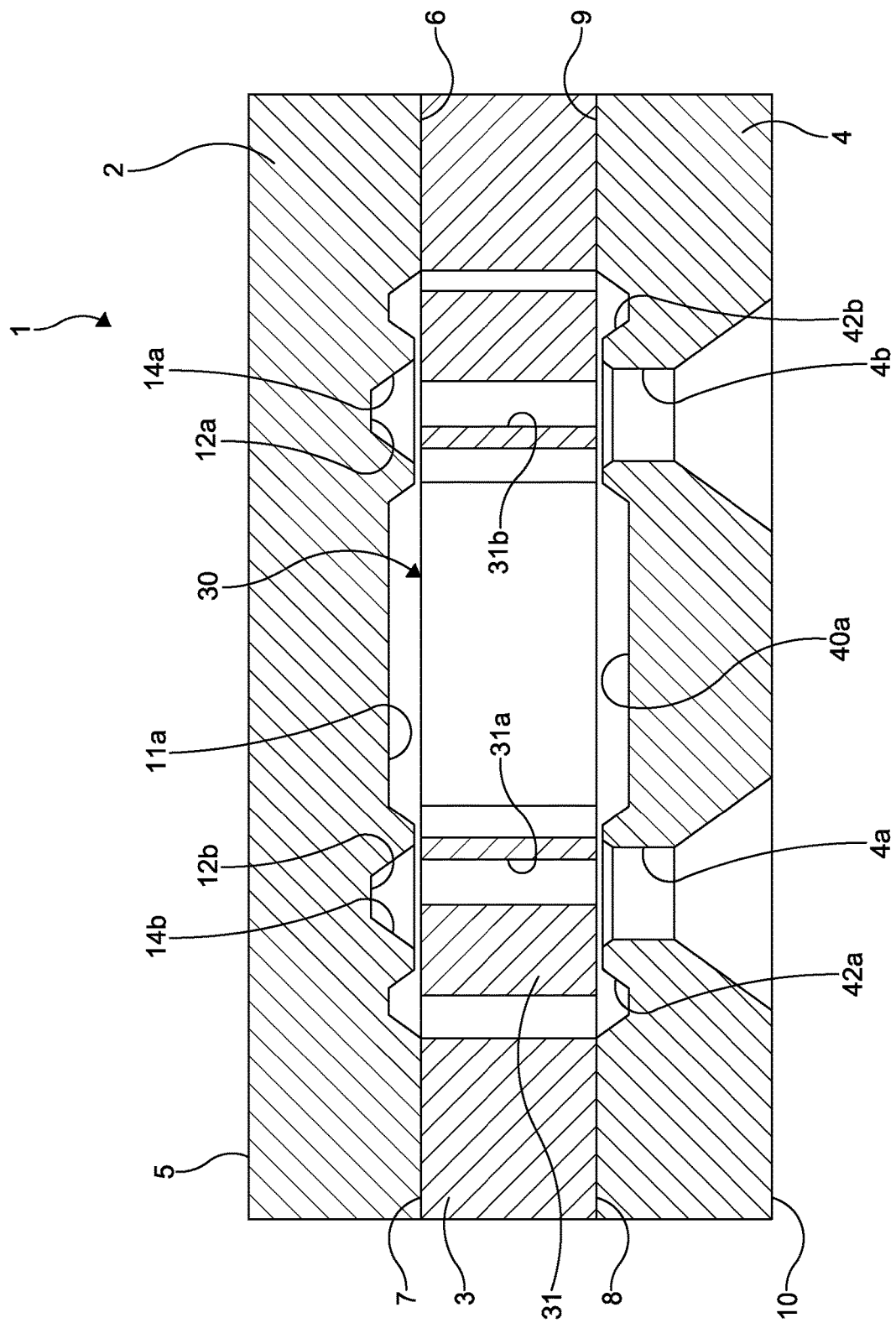
FIG. 15 is a sectional elevational view of the cover plate, the intermediate plate, and the base plate illustrated in FIGS. 10 through 14 shown assembled.

FIG. 15 illustrates the structure of the assembled conventional microvalve 1 shown in FIGS. 10 through 14. As shown therein, non-recessed portions of the inner surface 6 of the cover plate 2 engage corresponding non-recessed portions of the first surface 7 of the intermediate plate 3. Similarly, non-recessed portions of the inner surface 9 of the base plate 4 engage corresponding non-recessed portions of the second surface 8 of the intermediate plate 3. The upper actuator arm cavity portion 11a provided on the cover plate 2, the intermediate plate 3, and the upper actuator arm cavity portion 40a provided on the base plate 4 all cooperate to define a closed internal cavity in which the sealing portion 31 of the displaceable member 30 is disposed for relative pivoting movement (movement to the left and to the right when viewing FIG. 15).

The microvalve 1 may be used as a control valve in a shock absorber, such as the shock absorber 70 shown in FIGS. 2 through 5. The embodiment of the microvalve 1 illustrated in FIGS. 8 through 15 is packaged in a conventional U-flow configuration, wherein the openings 4a and 4b (which define the outlet and inlet for the flow of fluid through the microvalve 1) are located on the same side (the base plate 4 side) of the microvalve 1. Alternatively, the microvalve 1 may be packaged in a conventional through-flow configuration, wherein the openings 4a and 4b are located on opposite sides (on the cover plate 2 and the base plate 4 sides) of the microvalve 1. The structure and manner of operation of such a through-flow configured microvalve is otherwise similar to the embodiment of the microvalve 1 described herein.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An adjustable shock absorber comprising:
    a housing defining an enclosed working space;
    a wall formed in the working space and separating the working space into first and second fluid chambers, the wall defining a base of a valve assembly, wherein the first fluid chamber is a working chamber, and wherein the second fluid chamber is a fluid reservoir;
    a plurality of compression valves formed in the wall, wherein the plurality of compression valves have pre-set configurations, and wherein the pre-set configurations of two of the plurality of compression valves correspond to a soft and a firm feel of the shock absorber, as experienced by a vehicle occupant; and
    a microvalve attached to at least one compression valve and operable to adjust fluid flow through the compression valve to one of a plurality of fluid flow rates.

2. The adjustable shock absorber according to claim 1, wherein the housing defines a remote fluid reservoir fluidly connected to a working chamber in a pressure tube of the adjustable shock absorber.

3. The adjustable shock absorber according to claim 1, wherein each compression valve is a compression pin/spring valve configured to selectively allow fluid flow from the working chamber to the fluid reservoir, and to prevent fluid flow from the fluid reservoir to the working chamber.

4. The adjustable shock absorber according to claim 1, wherein the pre-set configuration of a third of the plurality of compression valves corresponds to a medium feel of the shock absorber, as experienced by a vehicle occupant.

5. A method of adjusting a performance characteristic of an adjustable shock absorber, the method comprising:
    selecting one of a soft, a medium, and a firm ride characteristic of the adjustable shock absorber; and
    actuating one of a microvalve operatively connected to each one of three compression valves formed in a wall formed in an enclosed working space of a housing, the wall separating the working space into first and second fluid chambers;
    wherein the microvalve is operable to control fluid flow through each of the three compression valves to which the microvalve is attached;
    wherein a first one of the three compression valves is pre-set to correspond to a soft feel of the shock absorber, as experienced by a vehicle occupant;
    wherein a second one of the three compression valves is pre-set to correspond to a medium feel of the shock absorber, as experienced by a vehicle occupant; and
    wherein a third one of the three compression valves is pre-set to correspond to a firm feel of the shock absorber, as experienced by a vehicle occupant.

6. The method according to claim 5, wherein the housing defines a remote fluid reservoir fluidly connected to a working chamber in a pressure tube of the adjustable shock absorber.

7. The method according to claim 5, wherein the housing defines a pressure tube of the adjustable shock absorber.

8. An adjustable shock absorber comprising:
    a housing defining an enclosed working space;
    a wall formed in the working space and separating the working space into first and second fluid chambers;
    a first compression valve formed in the wall;
    a second compression valve formed in the wall and configured to allow only a minimal fluid flow necessary during low speed operation of the adjustable shock absorber; and
    a microvalve attached to the first and second compression valves and operable to adjust fluid flow through the first and second compression valves to one of a plurality of fluid flow rates.

9. The adjustable shock absorber according to claim 8, further including an orifice formed through the wall, the orifice defining the second compression valve and configured to allow only a minimal fluid flow necessary during low speed operation of the adjustable shock absorber.

10. An adjustable shock absorber comprising:
    a housing defining a pressure tube of the adjustable shock absorber, the pressure tube having an enclosed working space;
    a wall formed in the working space and separating the working space into first and second fluid chambers, the wall defining an axially movable piston, wherein the first fluid chamber is a first working chamber, and wherein the second fluid chamber is a second working chamber;
a compression valve formed in the wall; and
a microvalve attached to the compression valve and operable to adjust fluid flow through the compression valve to one of a plurality of fluid flow rates.

11. The adjustable shock absorber according to claim 10, wherein the compression valve is a compression pin/spring valve configured to selectively allow fluid flow from the first working chamber to the second working chamber, and to prevent fluid flow from the second working chamber to the first working chamber.

12. The adjustable shock absorber according to claim 10, wherein the compression valve is one of a plurality of compression valves.

13. The adjustable shock absorber according to claim 12, wherein the plurality of compression valves have pre-set configurations, and wherein the pre-set configurations of two of the plurality of compression valves correspond to a soft and a firm feel of the shock absorber, as experienced by a vehicle occupant.

14. The adjustable shock absorber according to claim 13, wherein the pre-set configuration of a third of the plurality of compression valves corresponds to a medium feel of the shock absorber, as experienced by a vehicle occupant.

15. The adjustable shock absorber according to claim 10, further including:
a second compression valve configured to allow only a minimal fluid flow necessary during low speed operation of the adjustable shock absorber; and
a microvalve attached to the second compression valve and operable to control fluid flow through the second compression valve.

16. The adjustable shock absorber according to claim 10, further including:
an orifice formed through the wall, the orifice configured to allow only a minimal fluid flow necessary during low speed operation of the adjustable shock absorber; and
a microvalve attached to the orifice and operable to control fluid flow through the orifice.

* * * * *